(12) United States Patent
Singh et al.

(10) Patent No.: US 9,608,925 B2
(45) Date of Patent: Mar. 28, 2017

(54) SYSTEM AND METHOD FOR TRANSMITTING AN ALERT USING A VIRTUAL EXTENSIBLE LAN (VXLAN) TUNNELING MECHANISM

(71) Applicant: Alcatel Lucent, Boulogne-Billancourt (FR)

(72) Inventors: Kanwar D. Singh, Sunnyvale, CA (US); Pradeep G. Jain, Sunnyvale, CA (US)

(73) Assignee: Alcatel Lucent, Boulogne-Billancourt (FR)

( * ) Notice: Subject to any disclaimer, the term of this patent is extended or adjusted under 35 U.S.C. 154(b) by 0 days.

(21) Appl. No.: 13/902,239

(22) Filed: May 24, 2013

(65) Prior Publication Data

US 2014/0348168 A1 Nov. 27, 2014

(51) Int. Cl.
*H04L 12/801* (2013.01)
*H04L 12/46* (2006.01)
*H04L 12/26* (2006.01)

(52) U.S. Cl.
CPC .......... *H04L 47/33* (2013.01); *H04L 12/4633* (2013.01); *H04L 12/4641* (2013.01); *H04L 43/10* (2013.01); *H04L 2212/00* (2013.01)

(58) Field of Classification Search
CPC ....................................................... H04L 43/10
USPC ....................................................... 370/245
See application file for complete search history.

(56) References Cited

U.S. PATENT DOCUMENTS

| | | | |
|---|---|---|---|
| 7,940,695 B1 | 5/2011 | Bahadur et al. | |
| 8,504,818 B2 | 8/2013 | Rao et al. | |
| 8,510,474 B2 | 8/2013 | Van Aken et al. | |
| 8,510,549 B2 | 8/2013 | Rossi et al. | |
| 2002/0049856 A1* | 4/2002 | Hujber | 709/242 |
| 2005/0071494 A1* | 3/2005 | Rundquist et al. | 709/232 |
| 2008/0279110 A1 | 11/2008 | Hart et al. | |
| 2011/0170426 A1* | 7/2011 | Kompella et al. | 370/242 |
| 2011/0286324 A1 | 11/2011 | Bellagamba et al. | |
| 2014/0075243 A1* | 3/2014 | Nagaraj | 714/32 |

FOREIGN PATENT DOCUMENTS

WO 2014189709 A1 11/2014

OTHER PUBLICATIONS

Mahalingam D., et al, "VXLAN: A Framework for Overlaying Virtualized Layer 2 Networks Over Layer 3 Networks," May 8, 2013, Internet Engineering Task Force, pp. 1-22.
Young X Xu Huawei, "NVGRE and VXLAN Encapsulation for L3VPN Extension," May 21, 2013, Internet Engineering Task Force, pp. 1-7.

(Continued)

*Primary Examiner* — Hassan Kizou
*Assistant Examiner* — Ashil Farahmand
(74) *Attorney, Agent, or Firm* — Chiesa Shahinian & Giantomasi, PC

(57) ABSTRACT

A data packet comprising a header, the header having a format associated with a Virtual Extensible LAN (VXLAN) technology is generated at an originating tunnel end point device in a network. A predetermined bit in a reserved portion of the header is set to a predetermined value. The data packet is then transmitted.

10 Claims, 5 Drawing Sheets

(56) References Cited

OTHER PUBLICATIONS

Aggarwai, Rahul, et al., "OAM Mechanisms in MPLS Layer 2 Transport Networks,"Oct. 1, 2004, IEEE Communications Magazine, IEEE Service Center, vol. 42, No. 10, ISSN: 0163-6804, pp. 124-130.
Harrison, Neil, et al., "OAM Functionality for MPLS Networks," Feb. 1, 2001, ISSN: 0000-0004, 29 pgs.
Singh P., "VXLAN Router Alert Option," Internet Engineering Task Force, Mar. 3, 2014, pp. 1-12.
Jain K., "Generic Ovrlay OAM and Datapath Failure Detection," Internet Engineering Task Force, Feb. 13, 2014, pp. 1-44.
International Search Report and Written Opinion mailed on Aug. 18, 2014, in connection with International PCT application No. PCT/US14/38474, 14 pgs.
International Search Report and Written Opinion mailed on Sep. 2, 2014, in connection with International PCT application No. PCT/US14/38548, 13 pgs.
Sridharan A. et al., "NVGRE: Network Virtualization usin Generic Routing Encapsulation," Feb. 25, 2013, Internet Engineering Task Force, pp. 1-17.
Farinacci, D., et al., "Generic Routing Encapsulation (GRE)," Mar. 1, 2000, ISSN: 0000-0003, 10 pgs.
K. Kompella, et al., "Detecting Multi-Protocol Label Switched (MPLS) Data Plane Failures," Feb. 1, 2006, XP015044811, ISSN: 0000-0003, 50 pgs.
Jain K., et al., "Detecting VXLAN Segment Failure," Jun. 8, 2013, Internet Engineering Task Force, XP015090668, pp. 1-20.
International Search Report and Written Opinion mailed on Aug. 14, 2014, in connection with international PCT application No. PCT/US2014/037792, 14 pgs.
International Search Report and Written Opinion mailed on Aug. 12, 2014, in connection with international PCT application No. PCT/US2014/037868, 14 pgs.
International Search Report and Written Opinion mailed on Mar. 30, 2016, in connection with International Patent Application No. PCT/US16/12969, 14 pgs.
International Search Report and Written Opinion mailed on Apr. 8, 2016, in connection with International Patent Application No. PCT/US16/12989, 14 pgs.
"Network Functions Virtualisation (NFV); Infrastructure; Network Domain," Group Specification, European Telecommunication Standards Institute (ETSI), vol. NFV INF, No. V1.1.1, Dec. 1, 2014, pp. 26-36.
Katz et al., "Bidirectional Frowarding Detection (BFD)," Internet Engineering Task Force; Internet Society 4, Jun. 1, 2010, pp. 1-49.
Luyuan et al, "BGP IP MLS VPN Virtual CE," Internet Engineering Task Force; Internet Society 4, Jul. 5, 2014, pp. 1-21.

\* cited by examiner

US 9,608,925 B2

SYSTEM AND METHOD FOR TRANSMITTING AN ALERT USING A VIRTUAL EXTENSIBLE LAN (VXLAN) TUNNELING MECHANISM

TECHNICAL FIELD

This specification relates generally to systems and methods for transmitting information within a communication network, and more particularly, to systems and methods for transmitting an alert using a Virtual Extensible LAN (VXLAN) tunneling mechanism.

BACKGROUND

Virtual Extensible LAN (VXLAN) is a network virtualization technology adapted to ameliorate scalability problems associated with large cloud computing deployments. It can use, for example, a VLAN-like encapsulation technique to encapsulate MAC-based layer-2 Ethernet frames within layer 3 UDP packets. In accordance with a VXLAN tunneling mechanism, a first device, referred to as the originating tunnel end point, uses a format associated with VXLAN protocols to encapsulate a data packet, and transmits the encapsulated packet to a second device, referred to as the terminating tunnel end point. The terminating tunnel end point decapsulates the data packet and forwards it to an intended destination device.

SUMMARY

In accordance with an embodiment, a method for transmitting an alert within a data packet is provided. A data packet comprising a header, the header having a format associated with a Virtual Extensible LAN (VXLAN) technology, is generated at an originating tunnel end point device in a network. A predetermined bit in a reserved portion of the header is set to a predetermined value. The data packet is then transmitted.

In one embodiment, a second value associated with a selected VXLAN segment in the network is inserted into a selected portion of the header. The data packet is transmitted via the selected VXLAN segment.

In one embodiment, a second data packet is received at the originating tunnel end point device, and the data packet is generated by encapsulating the second data packet. In one embodiment, the second data packet comprises an Internet Protocol data packet. The second data packet may comprise a ping request.

In accordance with another embodiment, a data packet comprising a header, the header having a format associated with a Virtual Extensible LAN (VXLAN) technology, is received at a terminating tunnel end point device in a network. A determination is made that a predetermined bit in a reserved portion of the header has a predetermined value. At least a portion of the data packet is forwarded to a selected application residing on the terminating tunnel end point device, in response to determining that a predetermined bit in a reserved portion of the header has a predetermined value.

In one embodiment, the data packet is decapsulated, generating a second data packet. The second data packet may comprise an Internet Protocol data packet, for example.

In one embodiment, the selected application comprises an operations, administration, and maintenance application. For example, the selected application may comprise a ping application. In one embodiment, the second data packet comprises a ping request.

These and other advantages of the present disclosure will be apparent to those of ordinary skill in the art by reference to the following Detailed Description and the accompanying drawings.

DETAILED DESCRIPTION

Figure 1:
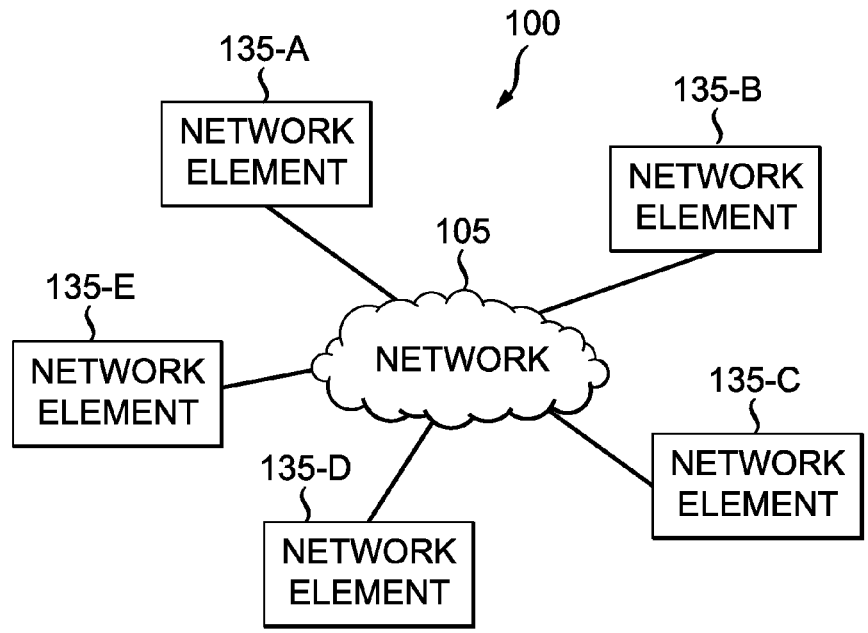
FIG. 1 shows a communication system in accordance with an embodiment.

FIG. 1 shows a communication system in accordance with an embodiment. Communication system 100 comprises a network 105, and a plurality of network elements including network elements 135-A, 135-B, 135-C, 135-D, 135-E, etc. For convenience, the term "network element 135" is used herein to refer to any one of network elements 135-A, 135-B, 135-C, 135-D, 135-E. Accordingly, any discussion herein referring to "network element 135" is equally applicable to each of network elements 135-A, 135-B, 135-C, 135-D, 135-E. Communication system 100 may comprise more or fewer than five network elements.

Network 105 may comprise any type of network. For example, network 105 may comprise one or more of a number of different types of networks, such as, for example, the Internet, an intranet, a local area network (LAN), a wide area network (WAN), a wireless network, a Fibre Channel-based storage area network (SAN), or Ethernet. Other networks may be used. Alternatively, network 105 may comprise a combination of different types of networks.

In one embodiment, each network element 135 comprises a device connected to network 105, and is capable of communicating via network 105. For example, a network element 135 may be a server computer such as an email server, a database server, a virtual machine, a software application, etc. Alternatively, a network element 135 may be a router.

In accordance with an embodiment, at least two network elements within communication system 100 communicate using the VXLAN technology. VXLAN is a network virtualization technology adapted to ameliorate scalability problems associated with large cloud computing deployments. It uses a VLAN-like encapsulation technique to encapsulate MAC-based layer-2 Ethernet frames within layer 3 UDP packets. In accordance with a VXLAN tunneling mechanism, a first device, referred to as the originating tunnel end point, uses a format associated with VXLAN protocols to encapsulate a data packet, and transmits the encapsulated packet to a second device, referred to as the terminating tunnel end point. The terminating tunnel end point decapsulates the data packet and forwards the data packet to an intended destination device.

Figure 2:
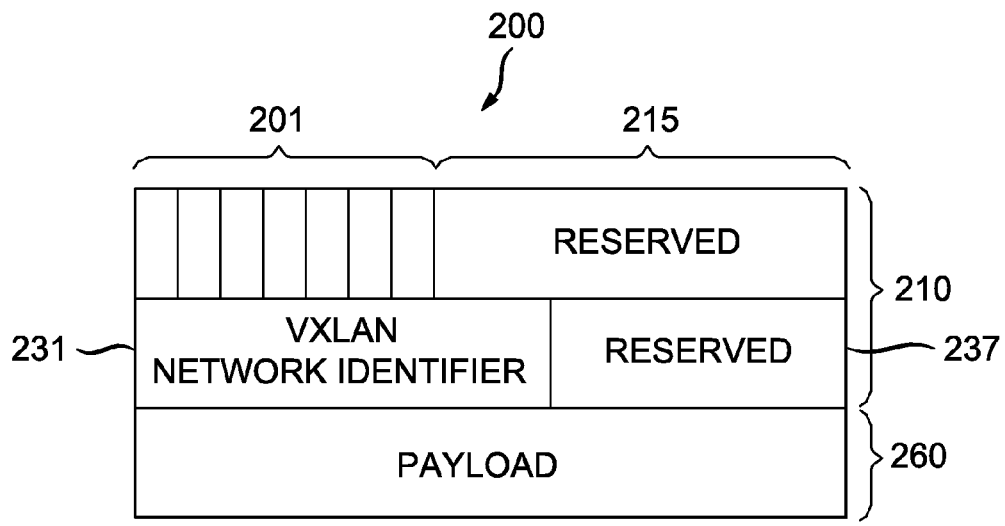
FIG. 2 shows a Virtual Extensible LAN (VXLAN) packet.

An encapsulated VXLAN data packet comprises a header having a format that complies with VXLAN protocols. FIG. 2 shows a VXLAN packet. VXLAN packet 200 comprises a header 210 and a payload 260.

In accordance with VXLAN protocols, header 210 comprises a plurality of sections, including an information section 201, a first reserved section 215, a VXLAN network identifier section 231, and a second reserved section 237.

In accordance with an embodiment, an originating tunnel end point device inserts information at a predetermined location within the header of a VXLAN data packet in order to inform the terminating tunnel end point device that the particular data packet requires further processing. For example, originating tunnel end point device 320 may insert information representing an alert into the header of a VXLAN data packet.

Figure 3:
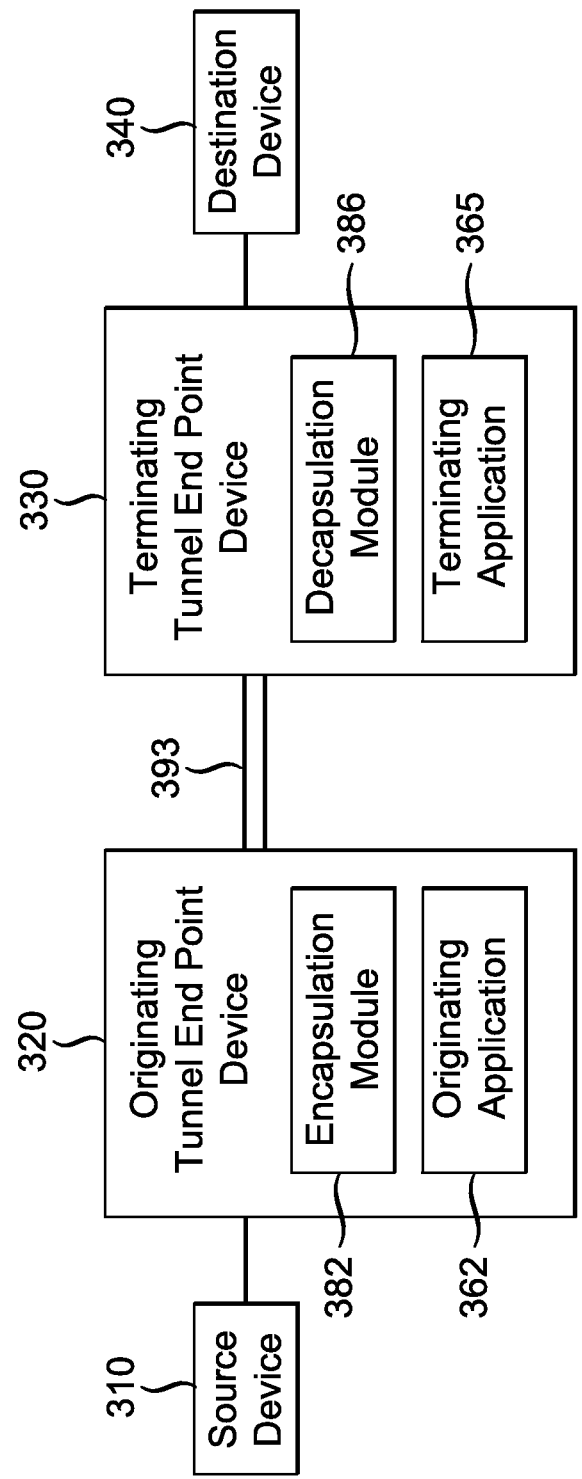
FIG. 3 shows a source device, an originating tunnel end point device, a terminating tunnel end point device, and a destination device in accordance with an embodiment.

FIG. 3 shows a source device 310, an originating tunnel end point device 320, a terminating tunnel end point device 330, and a destination device 340 in accordance with an embodiment. Source device 310, originating tunnel end point device 320, terminating tunnel end point device 330, and destination device 340 are respective network elements within communication system 100. Originating tunnel end point device 320 and terminating tunnel end point device 330 are connected via a link 393, which may be, for example, a network, or a direct connection.

Originating tunnel end point device 320 comprises an encapsulation module 382 configured to encapsulate a data packet in accordance with VXLAN protocols and transmit the VXLAN packet to a selected terminating tunnel end point device. Terminating tunnel end point device 330 comprises a decapsulation module 386 configured to decapsulate a VXLAN packet and transmit the packet to a selected destination device.

In accordance with an embodiment, encapsulation module 382 is further configured to insert specified information into the header of a VXLAN packet, at a predetermined location. Decapsulation module 386 is further configured to detect the presence of information at the predetermined location within the header of a VXLAN packet.

In the embodiment of FIG. 3, originating tunnel end point device 320 also comprises an originating application 362. Originating application 362 may be any type of application having any type of functionality. In the illustrative embodiment, originating application 362 is an operations, administration, and maintenance (OAM) application. For example, originating application 362 may be configured to examine incoming data packets, determine that it is necessary to insert information into a particular data packet, and instruct encapsulation module 382 accordingly. In another embodiment, originating application 362 may be a ping application configured to generate a data packet comprising a ping request, and provide the data packet to encapsulation module 382.

Similarly, terminating tunnel end point device 330 comprises a terminating application 365. Terminating application 365 may be any type of application having any type of functionality. In the illustrative embodiment, terminating application 365 is an operations, administration, and maintenance (OAM) application. For example, terminating application 365 may be configured to detect a ping message from a requesting device in network 105 and, in response, transmit a ping response message to the requesting device.

In accordance with an illustrative embodiment, source device 310 generates a data packet, for example, an Internet Protocol (IP) data packet, and transmits the IP data packet to originating tunnel end point device 320. In another embodiment, originating application 362 generates an IP data packet and transmits the IP data packet to encapsulation module 382.

Encapsulation module 382 receives the IP data packet and encapsulates the packet in accordance with VXLAN protocols, generating a VXLAN data packet. The VXLAN data packet thus includes a header similar to header 200 shown in FIG. 2.

In one embodiment, originating application 362 also instructs encapsulation module 382 to insert an alert into the VXLAN data packet.

Figure 4:
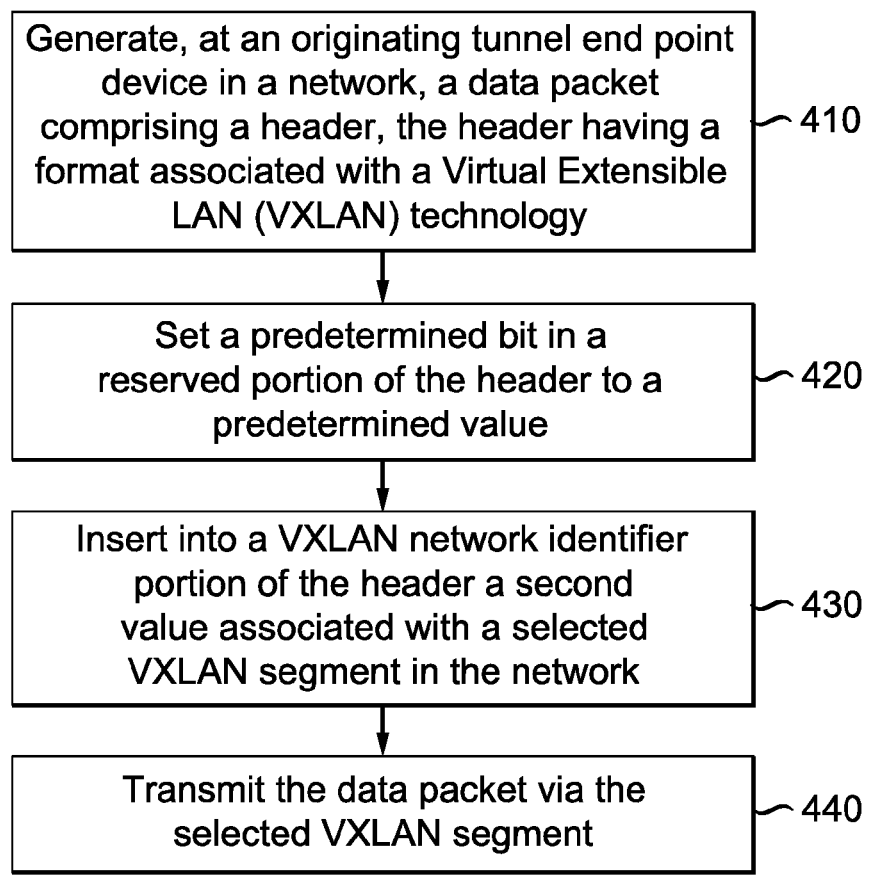
FIG. 4 is a flowchart of a method of transmitting information within a VXLAN data packet in accordance with an embodiment.

FIG. 4 is a flowchart of a method of transmitting information within a VXLAN data packet in accordance with an embodiment. In one illustrative embodiment, source device 310 generates an IP data packet, specifying destination device 340 as the intended destination, and transmits the IP data packet to originating tunnel end point device 320.

In another illustrative embodiment, originating application 362 generates a ping request, generates an IP data packet containing the ping request, and transmits the IP data packet to encapsulation module 382. Originating application 362 also instructs encapsulation module 382 to transmit an alert with the IP packet. Encapsulation module 382 receives the IP data packet and the instruction.

At step 410, a data packet comprising a header, the header having a format associated with a Virtual Extensible LAN (VXLAN) technology, is generated at an originating tunnel end point device in a network. Encapsulation module 382 (of originating tunnel end point device 320) encapsulates the IP data packet in accordance with VXLAN protocols, generating a VXLAN packet such as that shown in FIG. 5. VXLAN packet 500 comprises a header 510 and a payload 560. For example, in one embodiment, payload 560 may include an IP packet containing a ping request generated by originating application 362. Header 510 includes an information section 501, a first reserved section 515, a VXLAN network identifier section 531, and a second reserved section 537.

In the illustrative embodiment, encapsulation module 382 inserts an alert into the header of VXLAN packet 500.

Figure 5:
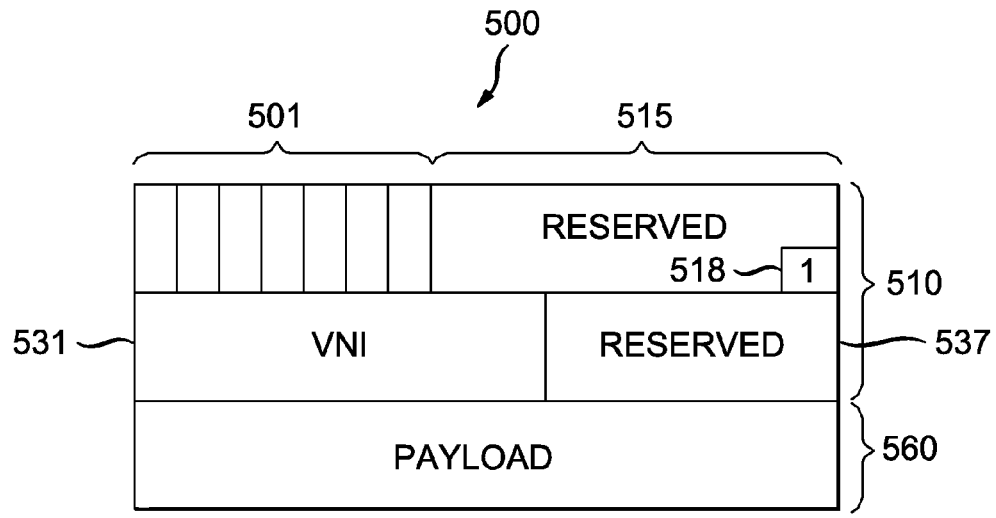
FIG. 5 shows a VXLAN packet in accordance with an embodiment.

Specifically, at step 420, a predetermined bit in a reserved portion of the header is set to a predetermined value. In the illustrative embodiment, encapsulation module 382 inserts a '1' at bit 518 within reserved portion 515 of header 510. FIG. 5 is illustrative only; in other embodiments, any bit within reserved portion 515 may be used.

At step 430, a second value associated with a selected VXLAN segment in the network is inserted into a VXLAN network identifier portion of the header. Encapsulation module 382 inserts an identifier ("VNI") associated with VXLAN segment 383 into VXLAN network identifier section 531.

At step 440, the data packet is transmitted via the selected VXLAN segment. Originating tunnel end point device 320 transmits the VXLAN packet via link 383 (which supports the specified VXLAN segment) to terminating tunnel end point device 330.

Figure 6:
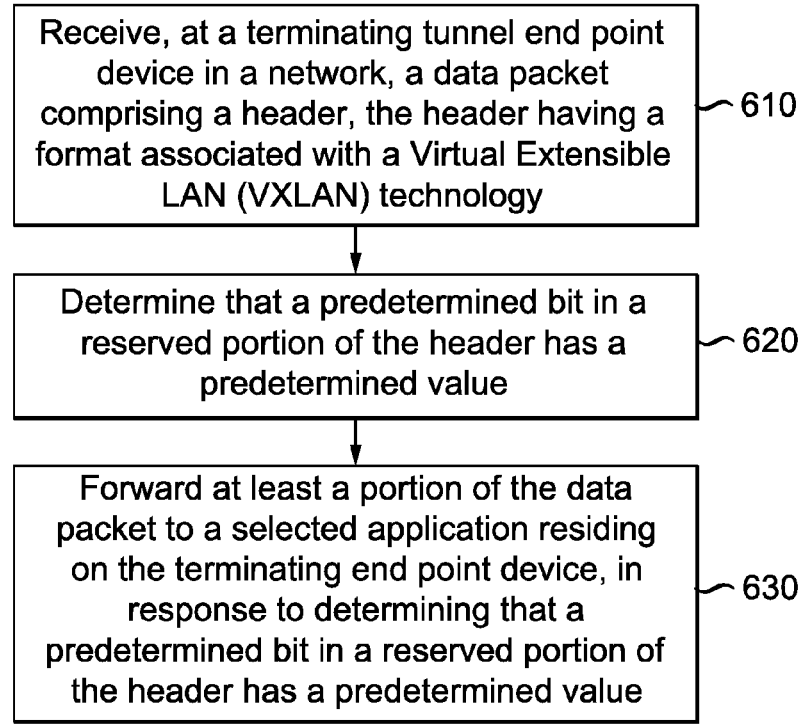
FIG. 6 is a flowchart of a method of detecting an alert within a VXLAN packet and responding to the alert in accordance with an embodiment.

FIG. 6 is a flowchart of a method of detecting an alert within a VXLAN packet and responding to the alert in accordance with an embodiment. At step 610, a data packet comprising a header, the header having a format associated with a Virtual Extensible LAN (VXLAN) technology is received at a terminating tunnel end point device in a network. In the illustrative embodiment, terminating tunnel end point device 330 receives VXLAN packet 500. Decapsulation module 386 decapsulates packet 500.

At step 620, a determination is made that a predetermined bit in a reserved portion of the header has a predetermined value. Decapsulation module 386 detects bit 518 within reserved portion 515 of packet 500.

At step 630, at least a portion of the data packet is forwarded to a selected application residing on the terminating tunnel end point device, in response to determining that a predetermined bit in a reserved portion of the header has a predetermined value. In the illustrative embodiment, decapsulation module 386, in response to detecting bit 518, extracts payload 560 from VXLAN packet 500 and transmits payload 560 to terminating application 365.

In an illustrative embodiment, terminating application 365 receives payload 560 and determines that payload 560 comprises a ping request from originating tunnel end point device 320. In response, terminating application 365 transmits an appropriate response directed to originating tunnel end point device 320.

In other embodiments, systems and methods described herein may be used to convey other types of information within a header of a VXLAN data packet.

In various embodiments, the method steps described herein, including the method steps described in FIGS. 4 and/or 6, may be performed in an order different from the particular order described or shown. In other embodiments, other steps may be provided, or steps may be eliminated, from the described methods.

Systems, apparatus, and methods described herein may be implemented using digital circuitry, or using one or more computers using well-known computer processors, memory units, storage devices, computer software, and other components. Typically, a computer includes a processor for executing instructions and one or more memories for storing instructions and data. A computer may also include, or be coupled to, one or more mass storage devices, such as one or more magnetic disks, internal hard disks and removable disks, magneto-optical disks, optical disks, etc.

Systems, apparatus, and methods described herein may be implemented using computers operating in a client-server relationship. Typically, in such a system, the client computers are located remotely from the server computer and interact via a network. The client-server relationship may be defined and controlled by computer programs running on the respective client and server computers.

Systems, apparatus, and methods described herein may be used within a network-based cloud computing system. In such a network-based cloud computing system, a server or another processor that is connected to a network communicates with one or more client computers via a network. A client computer may communicate with the server via a network browser application residing and operating on the client computer, for example. A client computer may store data on the server and access the data via the network. A client computer may transmit requests for data, or requests for online services, to the server via the network. The server may perform requested services and provide data to the client computer(s). The server may also transmit data adapted to cause a client computer to perform a specified function, e.g., to perform a calculation, to display specified data on a screen, etc. For example, the server may transmit a request adapted to cause a client computer to perform one or more of the method steps described herein, including one or more of the steps of FIGS. 4 and/or 6. Certain steps of the methods described herein, including one or more of the steps of FIGS. 4 and/or 6, may be performed by a server or by another processor in a network-based cloud-computing system. Certain steps of the methods described herein, including one or more of the steps of FIGS. 4 and/or 6, may be performed by a client computer in a network-based cloud computing system. The steps of the methods described herein, including one or more of the steps of FIGS. 4 and/or 6, may be performed by a server and/or by a client computer in a network-based cloud computing system, in any combination.

Systems, apparatus, and methods described herein may be implemented using a computer program product tangibly embodied in an information carrier, e.g., in a non-transitory machine-readable storage device, for execution by a programmable processor; and the method steps described herein, including one or more of the steps of FIGS. 4 and/or 6, may be implemented using one or more computer programs that are executable by such a processor. A computer program is a set of computer program instructions that can be used, directly or indirectly, in a computer to perform a certain activity or bring about a certain result. A computer program can be written in any form of programming language, including compiled or interpreted languages, and it can be deployed in any form, including as a stand-alone program or as a module, component, subroutine, or other unit suitable for use in a computing environment.

Figure 7:
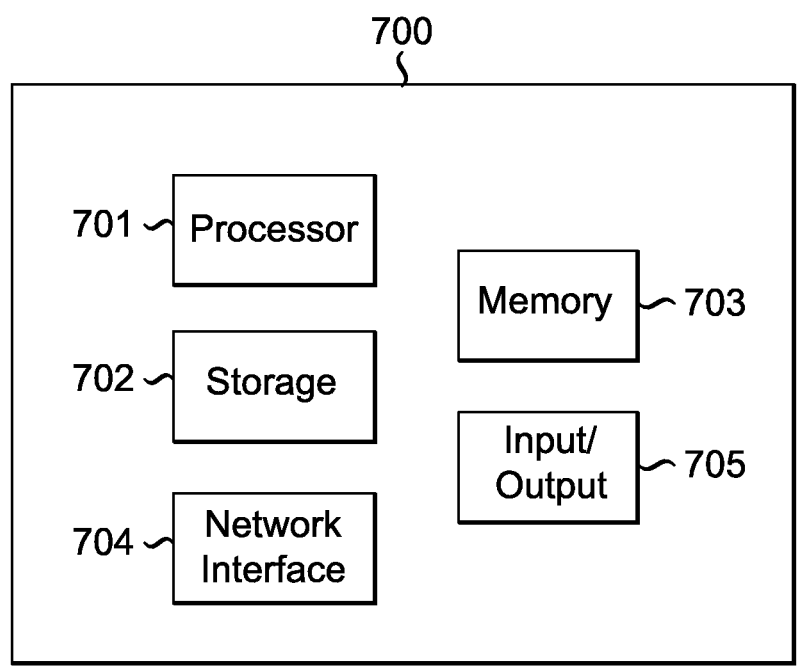
FIG. 7 shows components of an exemplary computer that may be used to implement certain embodiments of the invention.

A high-level block diagram of an exemplary computer that may be used to implement systems, apparatus and methods described herein is illustrated in FIG. 7. Computer 700 comprises a processor 701 operatively coupled to a data storage device 702 and a memory 703. Processor 701 controls the overall operation of computer 700 by executing computer program instructions that define such operations. The computer program instructions may be stored in data storage device 702, or other computer readable medium, and loaded into memory 703 when execution of the computer program instructions is desired. Thus, the method steps of FIGS. 4 and/or 6 can be defined by the computer program instructions stored in memory 703 and/or data storage device 702 and controlled by the processor 701 executing the computer program instructions. For example, the computer program instructions can be implemented as computer executable code programmed by one skilled in the art to perform an algorithm defined by the method steps of FIGS. 4 and/or 6. Accordingly, by executing the computer program instructions, the processor 701 executes an algorithm defined by the method steps of FIGS. 4 and/or 6. Computer 700 also includes one or more network interfaces 704 for communicating with other devices via a network. Computer 700 also includes one or more input/output devices 705 that enable user interaction with computer 700 (e.g., display, keyboard, mouse, speakers, buttons, etc.).

Processor 701 may include both general and special purpose microprocessors, and may be the sole processor or one of multiple processors of computer 700. Processor 701 may comprise one or more central processing units (CPUs), for example. Processor 701, data storage device 702, and/or memory 703 may include, be supplemented by, or incorporated in, one or more application-specific integrated circuits (ASICs) and/or one or more field programmable gate arrays (FPGAs).

Data storage device 702 and memory 703 each comprise a tangible non-transitory computer readable storage medium. Data storage device 702, and memory 703, may each include high-speed random access memory, such as dynamic random access memory (DRAM), static random access memory (SRAM), double data rate synchronous dynamic random access memory (DDR RAM), or other random access solid state memory devices, and may include non-volatile memory, such as one or more magnetic disk storage devices such as internal hard disks and removable disks, magneto-optical disk storage devices, optical disk storage devices, flash memory devices, semiconductor memory devices, such as erasable programmable read-only memory (EPROM), electrically erasable programmable read-only memory (EEPROM), compact disc read-only memory (CD-ROM), digital versatile disc read-only memory (DVD-ROM) disks, or other non-volatile solid state storage devices.

Input/output devices 705 may include peripherals, such as a printer, scanner, display screen, etc. For example, input/output devices 705 may include a display device such as a cathode ray tube (CRT) or liquid crystal display (LCD) monitor for displaying information to the user, a keyboard, and a pointing device such as a mouse or a trackball by which the user can provide input to computer 700.

Any or all of the systems and apparatus discussed herein, including network element 135, source device 310, originating tunnel end point device 320, terminating tunnel end point device 330, and destination device 340, and components thereof, including encapsulation module 382, originating application 362, decapsulation module 386, and terminating application 365, may be implemented using a computer such as computer 700.

One skilled in the art will recognize that an implementation of an actual computer or computer system may have other structures and may contain other components as well, and that FIG. 7 is a high level representation of some of the components of such a computer for illustrative purposes.

The foregoing Detailed Description is to be understood as being in every respect illustrative and exemplary, but not restrictive, and the scope of the invention disclosed herein is not to be determined from the Detailed Description, but rather from the claims as interpreted according to the full breadth permitted by the patent laws. It is to be understood that the embodiments shown and described herein are only illustrative of the principles of the present invention and that various modifications may be implemented by those skilled in the art without departing from the scope and spirit of the invention. Those skilled in the art could implement various other feature combinations without departing from the scope and spirit of the invention.

The invention claimed is:

1. A method for transmitting an alert within a data packet, the method comprising:
generating, at an originating tunnel end point device in a network, a data packet comprising a header, the header having a format associated with a Virtual Extensible LAN (VXLAN) technology;
encapsulating an internet protocol (IP) packet comprising a ping request in the data packet;
setting a predetermined bit in a reserved portion of the header of the data packet to a predetermined value, the predetermined value indicating that the ping request is to be extracted from the data packet and forwarded to an application of a terminating tunnel end point device for responding to the ping request; and
transmitting the data packet to the terminating tunnel end point device.

2. The method of claim 1, further comprising:
inserting into a VXLAN network identifier portion of the header a second value associated with a selected VXLAN segment in the network.

3. The method of claim 2, further comprising:
transmitting the data packet via the selected VXLAN segment.

4. A method comprising:
receiving, at a terminating tunnel end point device in a network, a data packet comprising a header, the header having a format associated with a Virtual Extensible LAN (VXLAN) technology, the data packet encapsulating an internet protocol (IP) packet comprising a ping request;
determining that a predetermined bit in a reserved portion of the header has a predetermined value, the predetermined value indicating that the ping request is to be extracted from the data packet and forwarded to an application of a terminating tunnel end point device for responding to the ping request; and
forwarding the ping request to the application in response to determining that the predetermined bit has the predetermined value.

5. The method of claim 4, further comprising:
decapsulating the data packet to generate the IP packet.

6. The method of claim 4, wherein the application comprises an operations, administration, and maintenance application.

7. The method of claim 6, wherein the application comprises a ping application.

8. A non-transitory computer readable medium having program instructions stored thereon, that, in response to execution by a processor, cause the processor to perform operations comprising:
generating, at an originating tunnel end point device in a network, a data packet comprising a header, the header having a format associated with a Virtual Extensible LAN (VXLAN) technology;
encapsulating an internet protocol (IP) packet comprising a ping request in the data packet;
setting a predetermined bit in a reserved portion of the header of the data packet to a predetermined value, the predetermined value indicating that the ping request is to be extracted from the data packet and forwarded to an application of a terminating tunnel end point device for responding to the ping request; and
transmitting the data packet to the terminating tunnel end point device.

9. The non-transitory computer readable medium of claim 8, the operations further comprising:
inserting into a VXLAN network identifier portion of the header a second value associated with a selected VXLAN segment in the network.

10. The non-transitory computer readable medium of claim 9, the operations further comprising:
transmitting the data packet via the selected VXLAN segment.

* * * * *